(12) United States Patent
Shao et al.

(10) Patent No.: US 9,317,557 B2
(45) Date of Patent: Apr. 19, 2016

(54) ANSWERING RELATIONAL DATABASE QUERIES USING GRAPH EXPLORATION

(71) Applicant: Microsoft Technology Licensing, LLC, Redmond, WA (US)

(72) Inventors: Bin Shao, Beijing (CN); Haixun Wang, Foster City, CA (US); Wei Fang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 161 days.

(21) Appl. No.: 14/062,036

(22) Filed: Oct. 24, 2013

(65) Prior Publication Data

US 2015/0120775 A1    Apr. 30, 2015

(51) Int. Cl.
*G06F 17/30* (2006.01)

(52) U.S. Cl.
CPC ............................... *G06F 17/30498* (2013.01)

(58) Field of Classification Search
CPC ............. G06F 17/30327; G06F 17/30477; G06F 17/30498; G06F 17/30513; G06F 17/30625; G06F 17/30938; G06F 17/30958; G06F 17/30961; G06F 17/30964; G06F 17/30967; G06F 17/30973
USPC ......... 707/713, 714, 715, 716, 798, 769, 778, 707/779
See application file for complete search history.

(56) References Cited

U.S. PATENT DOCUMENTS

| | | | |
|---|---|---|---|
| 5,701,460 A * | 12/1997 | Kaplan et al. | 707/748 |
| 6,915,290 B2 | 7/2005 | Bestgen et al. | |
| 7,328,220 B2 * | 2/2008 | Dobra et al. | 707/714 |
| 2008/0071748 A1 * | 3/2008 | Wroblewski et al. | 707/3 |
| 2012/0096043 A1 * | 4/2012 | Stevens, Jr. | 707/798 |
| 2013/0218899 A1 * | 8/2013 | Raghavan et al. | 707/741 |
| 2014/0046982 A1 * | 2/2014 | Chan et al. | 707/798 |
| 2014/0136520 A1 * | 5/2014 | Digana | 707/722 |
| 2015/0026158 A1 * | 1/2015 | Jin | 707/722 |

OTHER PUBLICATIONS

Pradhan, et al., "Modeling Relational Data as Graphs for Mining", In Proceeding of 15th International Conference on Management of Data, Dec. 9, 2009, 6 pages.

Virgilio, et al., "Converting Relational to Graph Databases", In Proceedings of the First International Workshop on Graph Data Management Experience and Systems, Jun. 23, 2013, 6 pages.

(Continued)

*Primary Examiner* — Greta Robinson
(74) *Attorney, Agent, or Firm* — Aneesh Mehta; Doug Barker; Micky Minhas

(57) ABSTRACT

Embodiments are directed to processing queries using schema graph traversal and to establishing a schema graph that allows queries to be answered by traversing graph nodes. In one scenario, a computer system receives a query which specifies relational tables and corresponding relationships that are to be retrieved from a relational database. The computer system accesses a schema graph that includes graph nodes representing relational tables, as well as edges that identify relationships between the relational tables. The graph nodes include relational data that was loaded from one storage area (e.g. a non-volatile storage area), and the schema graph is stored in a second storage area (e.g. a volatile storage area). The computer system then traverses the schema graph, beginning at a set of graph nodes and continuing along the edges to other graph nodes until the query has been satisfied, and then reports the results of the graph traversal.

24 Claims, 5 Drawing Sheets

(56) References Cited

OTHER PUBLICATIONS

"Extraction of Interaction Graphs from a Relational Database using the SPIDER-Graph Model", Retrieved on: Jul. 11, 2013, Available at: http://cs.ulb.ac.be/conferences/ebiss2011/files/soussi.pdf.

Ali, Qasim, "Graph Transformations based on Relational Databases", In Master Thesis, Department of Computer Science, Aug. 4, 2008, 74 pages.

Zou, et al., "gStore: Answering SPARQL Queries via Subgraph Matching", In Proceedings of the VLDB Endowment, vol. 4, Issue 8, Aug. 29, 2011, 12 pages.

"Matching Graph Patterns against Stem Graphs", In W3C, Sep. 1, 2009, 13 pages.

Zou, et al., "Distance-Join: Pattern Match Query in a Large Graph Database", In Proceeding of the VLDB Endowment, vol. 2, Issue 1, Aug. 24, 2009, 12 pages.

\* cited by examiner

ANSWERING RELATIONAL DATABASE QUERIES USING GRAPH EXPLORATION

BACKGROUND

Computer databases have long been used to store and provide access to data. Computer databases allow users to enter queries and receive results that (hopefully) satisfy the query. Various types of queries may be entered, and the type of query may depend on which type of database is being used. For instance, relational databases may allow users to enter certain types of queries and receive the corresponding results. One such type of query is a pattern matching query. Pattern matching queries are often used with relational databases, and may specifically be used with relational database applications such as warehousing applications.

BRIEF SUMMARY

Embodiments described herein are directed to processing queries using schema graph traversal and to establishing a schema graph that allows queries to be answered by traversing graph nodes. In one embodiment, a computer system receives a query from a query sender. The query specifies relational tables and their corresponding relationships that are to be retrieved from a relational database. The computer system accesses a schema graph that includes various graph nodes representing relational tables, as well as edges that identify relationships between the relational tables. The graph nodes include relational data that was loaded from one storage area (e.g. a non-volatile storage area), and the schema graph is stored in a second storage area (e.g. a volatile storage area). The computer system then traverses the schema graph, beginning at a set of graph nodes and continuing along the edges to other graph nodes until the query has been satisfied, and then reports the results of the graph traversal.

In another embodiment, a computer system accesses a relational database that includes database tables in a first data storage area that stores relational data. The computer system extracts a schema graph from the accessed relational database. The schema graph includes graph nodes representing the accessed database tables. The schema graph further includes edges that identify relationships between the graph nodes. The schema graph itself is stored in a second, different storage area. The computer system then associates relational tables with the graph nodes of the schema graph, so that both the relational tables and the relational tables' corresponding relationships are accessible via the schema graph. The computer system further receives a query that specifies relational tables and corresponding relationships that are to be retrieved from the relational database, and traverses the edges connecting the graph nodes of the schema graph to execute the received query.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
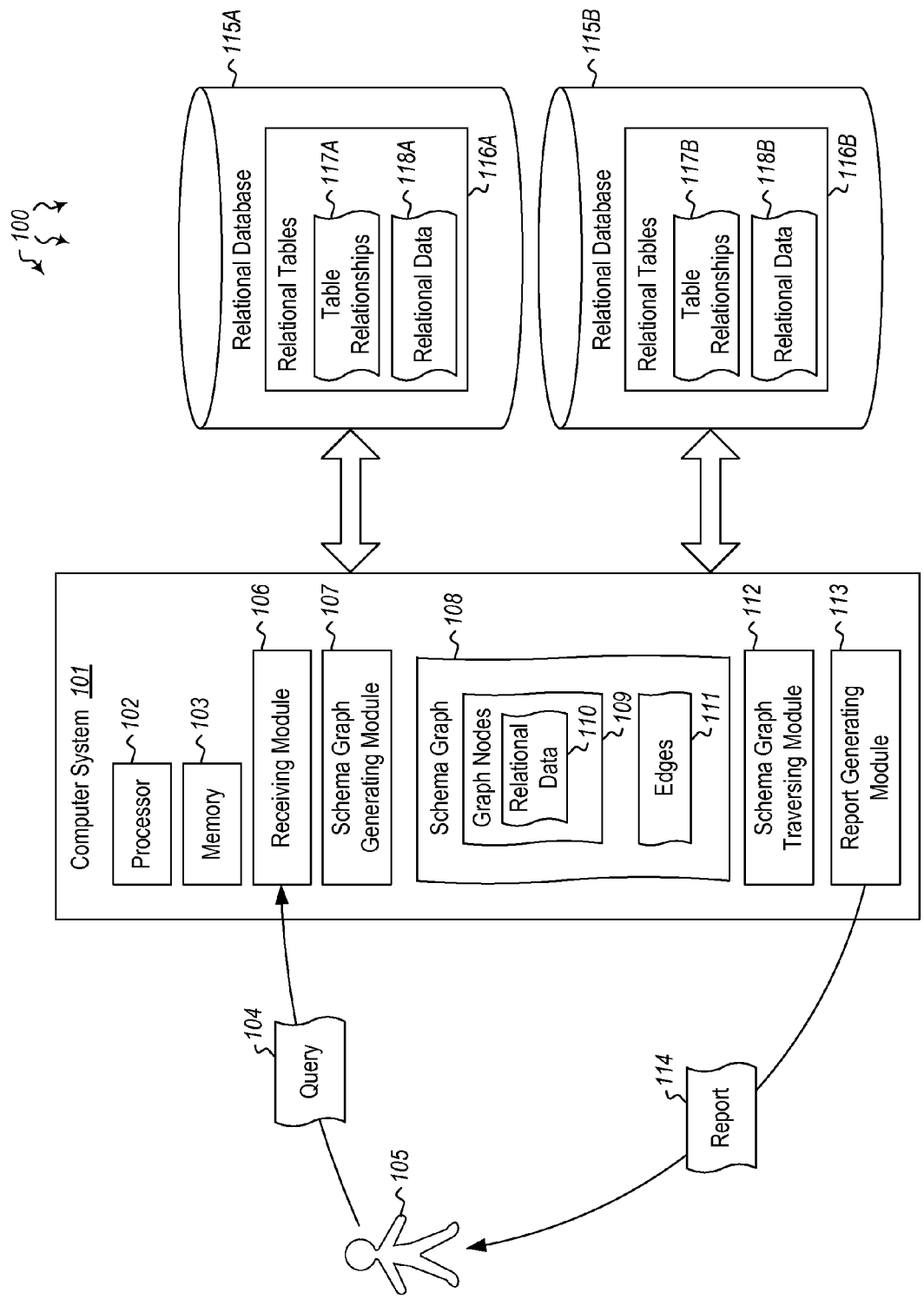
FIG. 1 illustrates a computer architecture in which embodiments described herein may operate including processing queries using schema graph traversal and establishing a schema graph that allows queries to be answered by traversing graph nodes.

Embodiments described herein are directed to processing queries using schema graph traversal and to establishing a schema graph that allows queries to be answered by traversing graph nodes. In one embodiment, a computer system receives a query from a query sender. The query specifies relational tables and their corresponding relationships that are to be retrieved from a relational database. The computer system accesses a schema graph that includes various graph nodes representing relational tables, as well as edges that identify relationships between the relational tables. The graph nodes include relational data that was loaded from one storage area (e.g. a non-volatile storage area), and the schema graph is stored in a second storage area (e.g. a volatile storage area). The computer system then traverses the schema graph, beginning at a set of graph nodes and continuing along the edges to other graph nodes until the query has been satisfied, and then reports the results of the graph traversal.

In another embodiment, a computer system accesses a relational database that includes database tables in a first data storage area that stores relational data. The computer system extracts a schema graph from the accessed relational database. The schema graph includes graph nodes representing the accessed database tables. The schema graph further includes edges that identify relationships between the graph nodes. The schema graph itself is stored in a second, different storage area. The computer system then associates relational tables with the graph nodes of the schema graph, so that both the relational tables and the relational tables' corresponding relationships are accessible via the schema graph. The computer system further receives a query that specifies relational tables and corresponding relationships that are to be retrieved from the relational database, and traverses the edges connecting the graph nodes of the schema graph to execute the received query.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, single- or multi-processor systems having hardware processors, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system includes at least one hardware processor 102 and some type of system memory 103 (typically volatile memory). The computer system also includes modules for performing a variety of different functions. For instance, the receiving module 106 receives queries (among other data) from different users. User 105, for example, may send query 104 to the computer system 101. The receiving module 106 may receive the query and either perform some type of processing on the query (such as translation from one query type to another), or may simply pass the received query to another computer system module.

The schema graph generating module 107 may be configured to generate a schema graph (e.g. 108) from data accessed in either or both of relational databases 115A and 115B. As the term is used herein, a "schema graph" is a graph that is generated based on relational tables (e.g. 116A/116B) and their relationships (117A/117B). The graph includes nodes and edges, where the nodes represent relational database tables, and the edges represent relationships between those database tables. The schema graph thus forms a graphical representation of the general table-relationship structure of a relational database. The nodes 109 of the schema graph 108 may include relational data 110 (which is represented in the relational databases 115A/115B as relational data 118A/118B). This relational data may correspond to each graph node (and hence, to its corresponding relational table). The edges 111 may similarly correspond to (or be derived from) the database table relationships 117A/117B, which show the primary key, foreign key or other relationships between database tables.

Data and data relationships may be extracted from the relational databases 115A/115B in a variety of different manners. In some cases, for each relational table, the following information is extracted: one or more sets of primary key (PK) columns, one or more foreign key sets (FKSs), and one or more sets of foreign keys referencing the current PK (i.e. a reverse foreign key set (RFKS)). During the extractions, at least in some embodiments, it is assumed that each table has a PK, and that tables without PKs are ignored. Relations are extracted from primary key-foreign key relations. The relational tables 116A and relationships 117A may then be mapped to graph nodes 109 and edges 111.

In one embodiment, if $|FKS| \leq 1$ or $|RFKS| > 0$, the current table is mapped to a graph node. If a table T1 has a foreign key pointing to another table T2, a FK edge (T1→T2) may be created, along with an RFK edge (T2→T1). In some cases, the tables can be processed in a specified order to achieve increased performance. If table T1 has a foreign key pointing to table T2, a dependency may be created between $T_2 < T_1$. A topological sort may be performed on the tables according to the dependency order. Any circles found in this process may automatically be broken. If $|FKS|=2$ and columns−FK=∅, two directed edges will be created which link the two entities referenced by the these two FKSs. If $|FKS|=2$ and Columns−FK≠∅, then two directed edges with associated edge data linking these two entities will be created. These directed edges are referenced by the two FKSs. The data stored in the other columns (Columns−FK) is converted to associated edge data. If $|FKS|>2$, a hyperedge is created to link the entities pointed to by these FKSs. In this manner, database tables may be mapped to graph nodes 109 of the schema graph 108.

Once the relational tables and table relationships are mapped to the graph nodes and edges of the schema graph 108 (in the manner above, or in some other manner), the schema graph traversing module 112 may traverse the nodes 109 and edges 111 of the schema graph to process the received query 104. The traversing may include beginning at a first node or set of nodes and continuing to one or more other nodes in the schema graph, until enough nodes and corresponding relational data 110 have been accessed that the query can be satisfied. Once the traversal is complete for a given query, the report generating module 113 generates a report detailing the results of the query. The schema graph traversal thus provides the results of the query using substantially fewer steps.

For example, in a traditional structured query language (SQL) query, if data in three relational tables needed to be accessed (e.g. a Company table, a Problem table, and an Incident table, four joins would need to be created between an ID for the Company table and a first ID (ID1), between a second ID (ID2) and a Problem ID, between the Problem ID and a third ID (ID3), and between a fourth ID (ID4) and Incident ID. In the system described herein, to process a same or similar query, the schema graph traversing module 112 would traverse directly between a Company node and a Problem node, and then from the Problem node to the Incident node (two hops). Accordingly, using the embodiments described herein, the query above may be resolved in a two-hop graph traversal. These concepts will be explained further below with regard to methods 200 and 300 of FIGS. 2 and 3, respectively.

Figure 2:
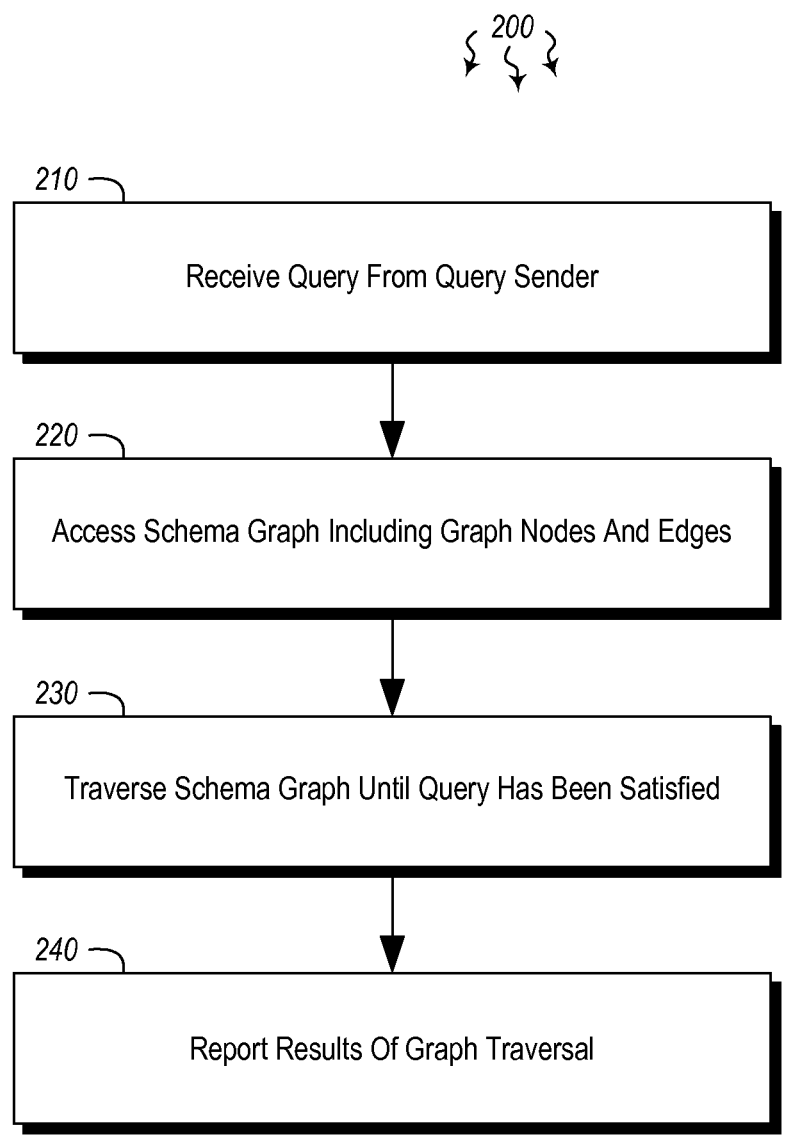
FIG. 2 illustrates a flowchart of an example method for processing queries using schema graph traversal.
Figure 3:
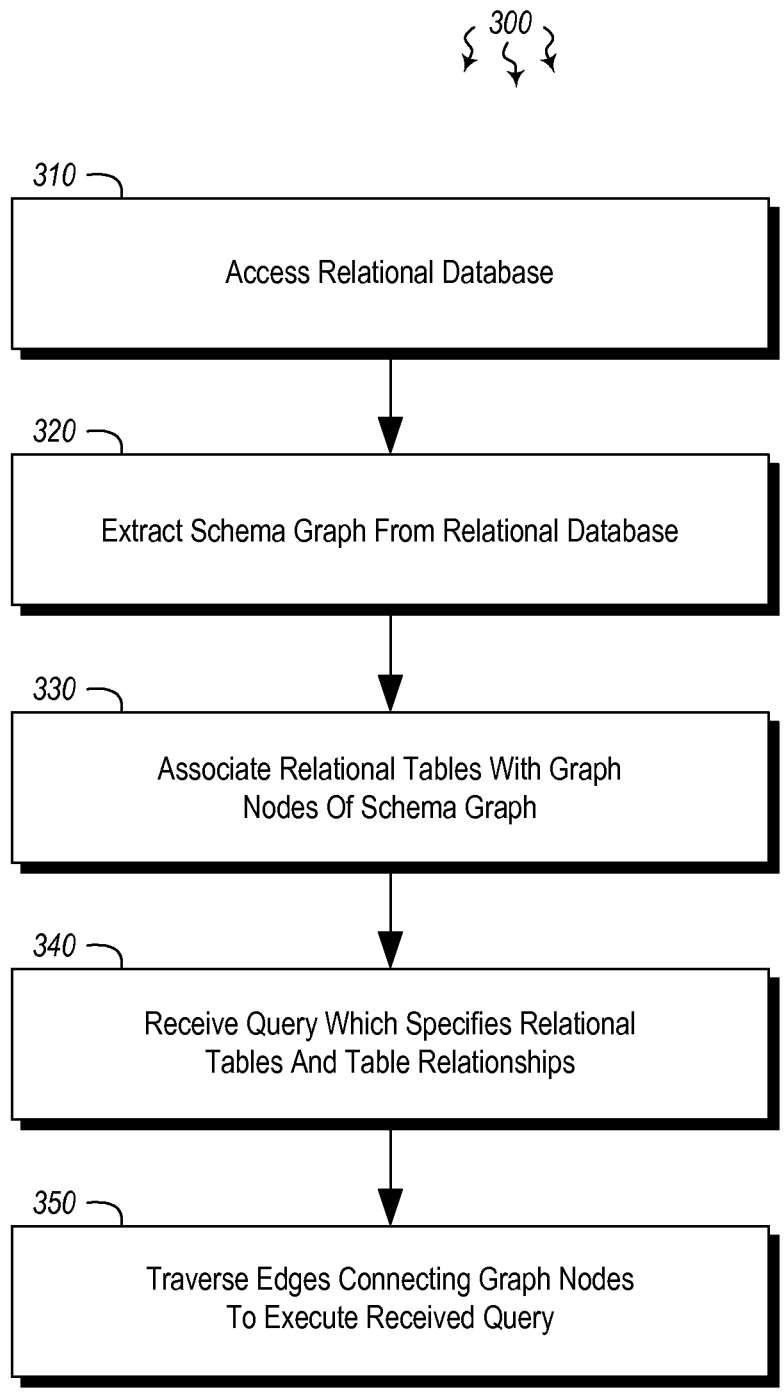
FIG. 3 illustrates a flowchart of an example method for establishing a schema graph that allows queries to be answered by traversing graph nodes.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for processing queries using schema graph traversal. The method 200 will now be described with frequent reference to the components and data of environment 100 of FIG. 1.

Method 200 includes an act of receiving a query at the computer system from a query sender, the query specifying one or more relational tables and their relationships that are to be retrieved from a relational database (act 210). For example, the receiving module 106 of computer system 101 may receive query 104 from user 105 or from another computer system or module. The query may specify which data (118A), relational tables (116A) and/or table relationships 117A are to be retrieved from a relational database 115A. (It should be noted that while relational database 115A or 116A may be referred to singly herein, it will be understood that the computer system 101 may communicate with and receive data from substantially any number of different relational databases (including different types of relational databases), and that the schema graph 108 may include data from relational database 115A, 116A or from any other relational database (not shown in FIG. 1)). The query may be any type of database query, including a multi-join query or pattern match query.

Figure 4:
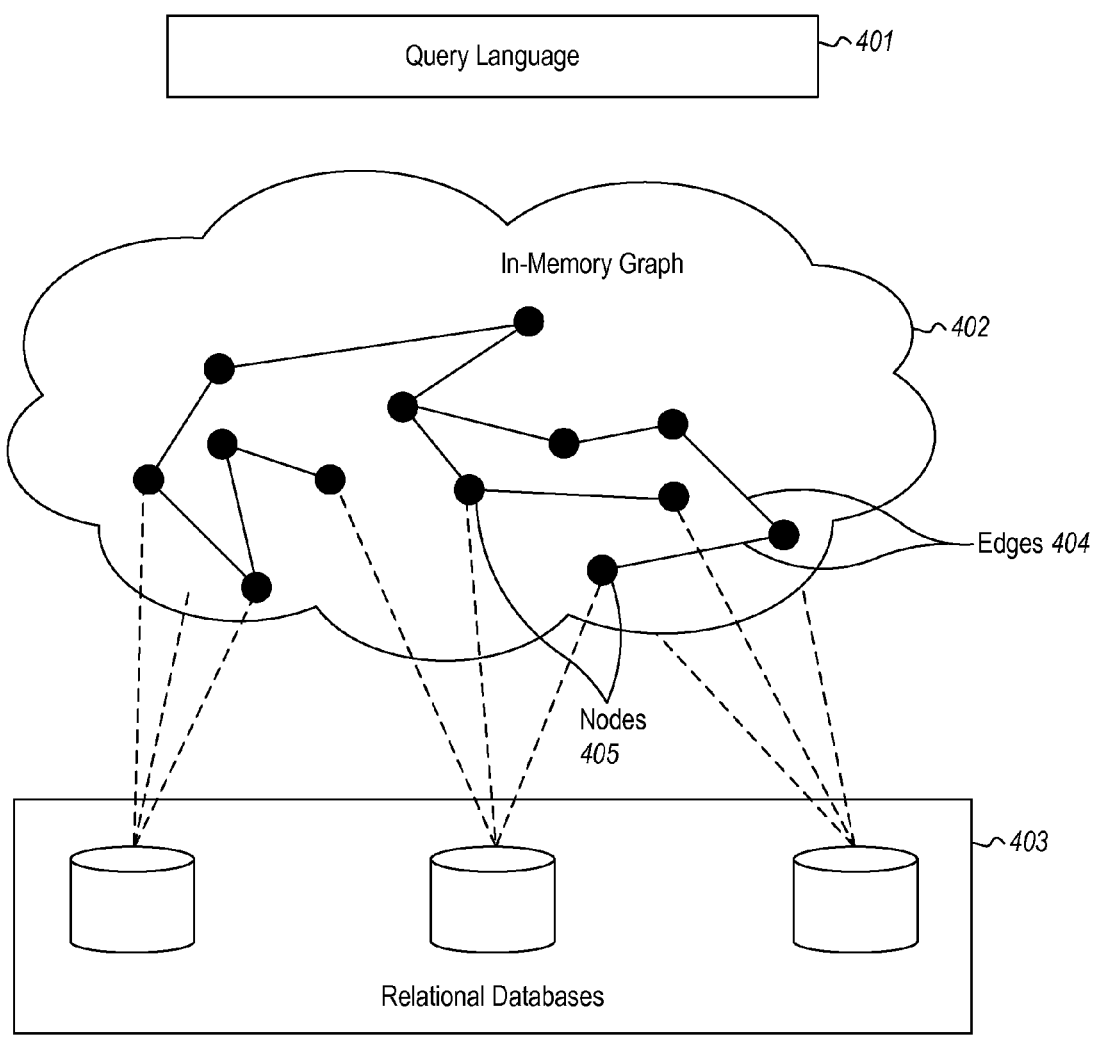
FIG. 4 illustrates an architecture that includes an in-memory schema graph.

Method 200 next includes an act of accessing a schema graph comprising one or more graph nodes representing relational tables and one or more edges that identify relationships between the relational tables, the graph nodes including relational data that was loaded from a first storage area, the schema graph itself being stored in a second storage area (act 220). Assuming that a schema graph has already been generated, the computer system may access the schema graph 108 in order to perform a node traversal. The schema graph includes graph nodes which correspond to relational tables in relational databases. Thus, graph nodes 109 may correspond to relational tables 116B in relational database 115B. The schema graph also includes edges 111 that correspond to table relationships 117B between the different relational tables. The relationships may include primary key-foreign key relationships, as well as other types of database table relationships. As shown in FIG. 4, the edges 404 show the relationships between the various graph nodes 405. The schema graph 402 is thus positioned between the query language 401 and the relational databases 403, to allow access to the data stored in the databases in a more efficient manner.

In some cases, the schema graph 402 may be stored in volatile memory, and may thus be referred to as an "in-memory" schema graph. The schema graph may be loaded into memory and run entirely (or at least substantially) in memory. This allows data reads to be executed more quickly, and thus leads to faster query response times. The relational data stored in the databases 403 (i.e. data 118B) may be stored in non-volatile memory, in volatile memory or in a combination of the two. Conventionally, however, relational database data is usually stored in non-volatile storage. The non-volatile storage may include hard drives, optical media, storage area networks (SANs), cloud storage or other data stores that implement non-volatile storage mechanisms.

Figure 5:
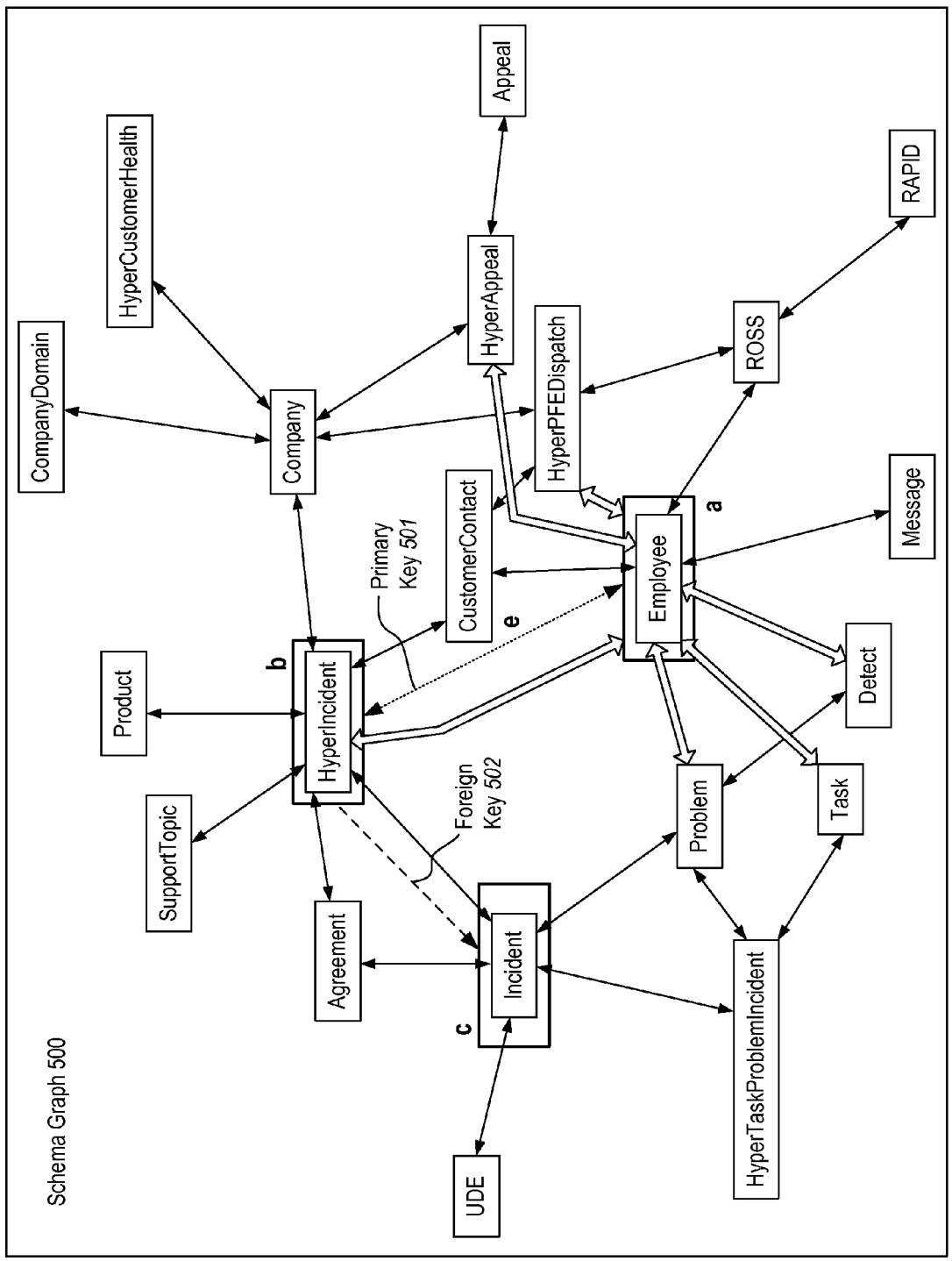
FIG. 5 illustrates an embodiment of a schema graph.

As shown in FIG. 5, the schema graph 500 illustrates an example embodiment of a schema graph. The schema graph includes various group nodes, including nodes "a" (Employee), "b" (Problem), and "c" (Incident). The dotted line between "a" and "b" illustrates a primary key-foreign key relationship between the Employee and Problem graph nodes. The dashed line between "b" and "c" illustrates a foreign key-primary key relationship between the Problem node and the Incident node. Thicker lines indicate that more relationships exist between those nodes, while thinner lines indicate that fewer relationships exist between the nodes. In this manner, the schema graph can illustrate a plurality of different nodes (i.e. relational tables) and the relationships between nodes (i.e. edges). The relationships may be primary key, foreign key, or other types of relationships.

In some cases, relational data in a primary key column is loaded into memory (e.g. 103) along with any corresponding primary key relationships. This data may be loaded automatically upon accessing the column. In other cases, a user (e.g. 105) may specify one or more columns from at least one database table that are to be added to the schema graph. These columns are then added to the (previously generated) schema graph. The user may specify the columns (or other data) using a declarative language. This allows for easy specification of data to load, and further allows a user to use a name (for example) in one query, store it in memory, and use that data to return an answer to future queries without having to access the relational tables again.

Returning to FIG. 2, method 200 includes an act of traversing the schema graph, beginning at a set of graph nodes and continuing along the edges to one or more other graph nodes until the query has been satisfied (act 230). Thus, as shown in FIG. 4, the nodes 405 of schema graph 402 may be traversed along edges 404 until sufficient data has been accessed to satisfy the received query (e.g. 104 of FIG. 1). The node traversal path may be a straight line from node to node, or may be a more involved path. For instance, the node traversal path may itself be a sub-graph, which allows for schema graph matching. The relational data 110 accessed at each node 109 may be data from multiple different databases (including different types of databases provided by different database providers). As such, the data access path may not always be a direct line from each node that is needed to answer the query. Moreover, the various relational tables and table relationships for the different databases may be accessed prior to receiving a query, so that upon receiving the query, the query is automatically processed by traversing the schema graph. This will be illustrated further in the examples below.

Method 200 also includes an act of reporting the results of the graph traversal (act 240). Thus, once the query has been processed using node traversal, the report generating module 113 generates a report 114 that is sent to the query sender (e.g. user 105), and/or to other recipients. Thus, the user may send a query, have that query be processed using a schema graph traversal, and receive the results of the query in report 114. The computer system 101 may be further configured to translate a pattern matching query (at the application level) to a multi-way join query (at the database level). Thus, for example, if the receiving module 106 receives a pattern matching query, the computer system 101 may translate that query into a multi-way join query. The multi-way join query may then be processed using schema graph traversal.

In one embodiment, pattern matching queries are processed using graph exploration. The schema graph 108 is first extracted, which includes the relational tables and table relationships of the relational database. As shown in FIG. 5, the extracted schema graph includes nodes representing relational tables and edges representing table relationships of the relational database. After extracting the schema graph, relational data is associated with data loaded from the relational database to the schema graph. A user's pattern matching queries may be specified using one or multiple paths starting from one or a number of entity nodes in the graph (as shown in FIG. 5). Graph traversal may be used instead of multi-way joins to answer the pattern matching query.

In one example embodiment, as generally shown in FIG. 5, a graph traversal may include the following commands to process a pattern matching query: FROM a in {"Employee.FullName=Smith Black"}, MATCH a(Employee)→b(Problem)→c(Incident), RETURN a, b, c. This query specifies a path on the schema graph 500, which starts from an employee named 'Smith Black', looking for all related incidents and the problems associated with this employee. Its corresponding SQL query can be expressed using multi-way joins as follows: SELECT *, FROM Employee a, EmployeeProblem b, Problem c, ProblemIncident d, Incident e, WHERE a.FullName='Smith Black' AND a.EmployeeID=b.EmployeeID AND b.ProblemID=c.ProblemID AND c.ProblemID=d.ProblemID AND d.IncidentID=e.IncidentID. As indicated above, the SQL query needs four joins while the graph traversal query can be answered by a two-hop schema graph traversal. Even in cases where there are multiple relations between two entities, using graph traversal, all related entities may be obtained. For example, in FIG. 5, entity a and entity b have several relations (there are multiple edges connecting them). By going across the path a→b→c, all related incident entities can be obtained, regardless of which relations they are. Establishing an implementing a schema graph will be explained further with regard to method 300 of FIG. 3 below.

FIG. 3 illustrates a flowchart of a method 300 for establishing a schema graph that allows queries to be answered by traversing graph nodes. The method 300 will now be described with frequent reference to the components and data of environment 100 of FIG. 1.

Method 300 includes an act of accessing a relational database comprising one or more database tables in a first data storage area that stores relational data (act 310). For example, computer system 101 may access relational databases 115A and/or 115B, which each includes one or more relational database tables 116A/116B and corresponding table relationships 117A/117B. As mentioned above, the relational tables and the data stored therein 118A/118B may be stored in non-volatile and/or volatile storage. Thus, at least in some cases, the first data storage area may comprise non-volatile storage such as hard disks, flash drives and optical media. The schema graph generating module 107 may extract a schema graph 108 from the accessed relational database (act 320). The schema graph includes graph nodes representing the accessed database tables, and edges that identify relationships between the graph nodes. The schema graph being stored in a second, different storage area which may comprise volatile storage. Thus, the schema graph may be stored in and run in volatile memory, thereby providing faster read and write times, and providing faster traversals between nodes.

Method 300 includes an act of associating one or more relational tables with the graph nodes of the schema graph, such that both the relational tables and the relational tables' corresponding relationships are accessible via the schema graph (act 330). Associating the relational tables (e.g. 116A) with the graph nodes 109 of the schema graph 108 may include loading the relational data 110 corresponding to the graph nodes into the schema graph (i.e. into the same volatile storage area). As such, the relational databases' relational tables and table relationships are accessible through the schema graph. Additionally or alternatively, portions of relational data 118A may be loaded into the schema graph along with the nodes and edges already loaded.

In some embodiments, the schema graph 108 illustrates primary key and foreign key relationships between graph nodes (as generally shown in schema graph 500 of FIG. 5). The primary key-foreign key relationships may be imported into the schema graph prior to receiving the query. As such, the schema graph already knows about the relational tables of the various databases represented in the schema graph, and is further aware of those tables' relationships with other tables. Accordingly, because the schema graph contains this information, it allows for very fast hops between graph nodes. Each primary key-foreign key relationship in the relational tables may be converted to and represented as an edge in the schema graph. These edges may be traversed from node to node in order to access the data needed to satisfy a query.

Method 300 further includes an act of receiving a query at the computer system, the query specifying one or more relational tables and their relationships that are to be retrieved from the relational database (act 340). User 105 (or another user or entity) may send query 104 to the receiving module of computer system 101. The query may be substantially any type of database query, designed for any of a variety of different databases. The query may specify which relational tables and corresponding relationships are to be retrieved from the relational database(s). Some portions of data may be retrieved from one relational database (e.g. 115A), and some portions of data may be retrieved from another relational database (e.g. 115B), perhaps of a different type or brand name. Because the schema graph may extract and store graph nodes representing relational tables for a variety of different database types, the schema graph 108 may include graph nodes 109 and edges 111 representing a variety of different relational tables and table relationships.

The schema graph traversing module 112 traverses the edges connecting the graph nodes of the schema graph to execute the received query (act 350). Thus, the relational tables and table relationships specified by the user in the query may be accessed using node traversal. These graph nodes may be populated with relational data 110 which may be used in processing the query. In some cases, traversing the edges connecting the graph nodes may return multiple related incident entities, regardless of the entities' relations to each other. The schema graph node traversal ensures that each related incident entity will be returned. When associated primary key-foreign key or other relationships are determined, various portions of additional information may be displayed on the corresponding edges. For instance, information about the relationship (e.g. 117A) may be displayed in the schema graph, either in word or graphic form next to the edge, or the edge itself may include special characteristics designating it as a certain type of edge (e.g. hyperedge) or relationship (e.g. a foreign key relationship). The special characteristics may include special line coloring, thinner or thicker lines, lighter or darker lines, dashed, dotted or other specialized lines, etc. Thus, in this manner, a user may be able to look at the schema graph (as in FIG. 5) and view the relationships between nodes more easily, as each table relationship has its own specialized form when displayed as an edge in the schema graph.

In this manner, methods, systems and computer program products are provided which process queries using schema graph traversal. Moreover, methods, systems and computer program products are provided which establish a schema graph that allows queries to be answered by traversing graph nodes.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer system comprising the following:
   one or more processors;
   one or more computer-readable storage media having stored thereon computer-executable instructions that, when executed by the one or more processors, cause the computing system to execute a method for processing a query using schema graph traversal, the method comprising the following:
   an act of receiving a query at the computer system from a query sender, the query specifying one or more relational tables and their relationships that are to be retrieved from a relational database;
   an act of creating a schema graph comprising one or more graph nodes representing relational tables and one or more edges that identify relationships between the relational tables, the graph nodes including relational data that was loaded from a first storage area, the schema graph itself being stored in a second storage area, wherein the creating the schema graph includes at least the following:

accessing a plurality of relational tables;

generating a plurality of graph nodes, with a separate graph node for each of the plurality of relational tables represented by the schema graph;

generating a plurality of edges between different graph nodes that define the relationships between the relational tables, at least a first edge of the plurality of edges and a second edge of the plurality of edges define different relationship attributes, such that nodes connected by the first edge have at least one of a different type or a different quantity of relationships than different nodes that are connected by the second edge; and visually representing the schema graph with the plurality of nodes and the plurality of edges, wherein the first and second edges are represented as separate lines with different display attributes, the different display attributes corresponding to different relationship attributes between different nodes;

an act of traversing the schema graph, beginning at a set of graph nodes and continuing along the edges to one or more other graph nodes until the query has been satisfied; and an act of reporting the results of the graph traversal.

2. The computer system of claim 1, wherein the first storage area comprises non-volatile memory, and second storage area comprises volatile memory, such that the schema graph runs in volatile memory.

3. The computer system of claim 1, wherein the schema graph illustrates primary key and foreign key relationships between graph nodes.

4. The computer system of claim 3, wherein data in a primary key column is loaded into memory along with one or more primary key relationships.

5. The computer system of claim 1, wherein the relational tables are accessed to extract table relationships prior to receiving the query, such that upon receiving the query, the query is automatically processed using the schema graph.

6. The computer system of claim 1, wherein a user specifies one or more columns from at least one database table that are to be added to the schema graph.

7. The computer system of claim 6, wherein the specified columns are specified using a declarative language.

8. The computer system of claim 1, wherein the plurality of graph nodes represent at least two different types of relational tables.

9. The computer system of claim 1, wherein the node traversal path itself comprises a sub-graph.

10. The computer system of claim 1, further comprising an act of translating a pattern matching query to a multi-way join query.

11. The computer system of claim 10, wherein the multi-way join query is processed using schema graph traversal.

12. The computer system of claim 1, wherein the results of the graph traversal are reported to the sender of the query.

13. A computer system comprising the following:
one or more processors;
system memory;
one or more computer-readable storage media having stored thereon computer-executable instructions that, when executed by the one or more processors, cause the computing system to execute a method for establishing a schema graph that allows queries to be answered by traversing graph nodes, the method comprising the following:

an act of accessing a relational database comprising one or more database tables in a first data storage area that stores relational data;

an act of extracting a schema graph from the accessed relational database, the schema graph comprising graph nodes representing the accessed database tables, the schema graph further comprising edges, which are displayed as corresponding lines and that visually represent relationships between the graph nodes, wherein at least two edges are represented as separate lines with different display attributes, the different display attributes corresponding to different relationship attributes between different nodes, the schema graph being stored in a second, different storage area;

an act of associating one or more relational tables with the graph nodes of the schema graph, such that both the relational tables and the relational tables' corresponding relationships are accessible via the schema graph;

an act of receiving a query at the computer system, the query specifying one or more relational tables and their relationships that are to be retrieved from the relational database; and an act of traversing the edges connecting the graph nodes of the schema graph to execute the received query.

14. The computer system of claim 13, wherein the schema graph illustrates primary key and foreign key relationships between graph nodes.

15. The computer system of claim 14, wherein primary key-foreign key relationships are imported into the schema graph prior to receiving the query.

16. The computer system of claim 14, wherein the primary key-foreign key relationships are converted to edges in the schema graph.

17. The computer system of claim 14, wherein one or more portions of additional information are displayed on at least one edge based on the associated primary key-foreign key relationship.

18. The computer system of claim 14, wherein one or more different kinds of edges are displayed in the schema graph based on the associated primary key-foreign key relationship for that edge.

19. The computer system of claim 13, wherein traversing the edges connecting the graph nodes returns a plurality of related incident entities, regardless of the entities' relations.

20. The computer system of claim 13, wherein the different display attributes include line thickness.

21. The computer system of claim 13, wherein the different display attributes include line type.

22. The computer system of claim 13, wherein the different display attributes include line color.

23. The computer system of claim 13, wherein different relationship attributes comprise different quantities of relationships existing between different nodes.

24. At a computer system including at least one processor, a computer-implemented method for processing a query using schema graph traversal, the method comprising:

an act of receiving a query at the computer system from a query sender, the query specifying one or more relational tables and their primary key-foreign key relationships that are to be retrieved from a relational database;

an act of accessing a schema graph comprising one or more graph nodes representing relational tables and one or more edges that identify primary key-foreign key relationships between the relational tables, the graph nodes including relational data that was loaded from non-volatile storage, the schema graph itself being stored in volatile storage;

visually representing the schema graph with the plurality of nodes and the plurality of edges, wherein at least two edges are represented as separate lines with different display attributes, the different display attributes corresponding to different relationship attributes between different nodes;

an act of traversing the schema graph, beginning at a set of graph nodes and continuing along the edges to one or more other graph nodes until the query has been satisfied; and an act of reporting the results of the graph traversal.

* * * * *